Patented May 12, 1931

1,804,531

UNITED STATES PATENT OFFICE

RUDOLF HEIL, OF OFFENBACH-ON-THE-MAIN, GERMANY, ASSIGNOR TO GENERAL ANILINE WORKS, INC., OF NEW YORK, N. Y., A CORPORATION OF DELAWARE

NEW VAT DYESTUFFS OF THE DIPYRAZOLANTHRONE SERIES AND PROCESS OF MAKING SAME

No Drawing. Application filed October 5, 1927, Serial No. 224,283, and in Germany October 9, 1926.

My invention relates to new vat dyestuffs of the dipyrazolanthrone (pyrazole-anthrone-yellow) series, which are obtained by heating to temperatures greater than 100° and not above 200° a compound of the dipyrazolanthrone series corresponding probably to the general formula:

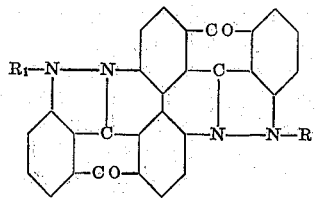

in which formula R and $R_1$ mean hydrogen atoms, one of which may be replaced by an alkyl group, with an aldehyde in presence of an acid chloride as condensing agent, advantageously with addition of a diluent. The aforesaid formula is assigned to the compounds of the dipyrazolanthrone series according to the statements given in scientific literature. Dipyrazolanthrone itself is described in German Patent No. 255641, among its substitution products for instance the halogenated derivatives are named in U. S. A. Patent No. 1595549. Aldehydes of the aliphatic as well as of the aromatic series are suitable for my process. Under the term "acid chlorides" as condensing agent I include in the following claims chlorides of phosphorus, antimony and aluminium. The course of the reaction cannot now be stated with certainty, but it may be supposed that the aldehyde reacts with one of the groups signified in the aforesaid formula by $N-R$ or $N-R_1$.

The new dyestuffs obtained according to my process are when dry yellowish colored mostly crystalline powders, soluble in concentrated sulfuric acid with a bluish red color. They dye cotton from a bluish to greenish hydrosulfite vat yellow to orange shades, particularly fast to alkali.

In order to further illustrate my invention the following examples are given, the parts being by weight and all temperatures in centigrade degrees; but I wish it to be understood, that my invention is not limited to the particular products or reacting conditions mentioned therein.

Example 1

1 part of powdered dipyrazolanthrone is finely suspended in 10 parts of benzaldehyde and while stirring 1 part of phosphorus trichloride is added at about 90°. The mass is heated for some time at 130–140° and after cooling down the raw product of reaction is separated from the excess of benzaldehyde by filtration or steam distillation. When recrystallized from diluents of a higher boiling point such as nitrobenzene or trichlorobenzene the dyestuff is obtained in a pure state. It crystallizes in fine scales of a golden lustre. It may be finely divided by mixing it with water and dyes cotton from a bluish green hydrosulfite vat blue shades turning to a pure yellow, when exposed to the air.

Example 2

1 part of dipyrazolanthrone is finely suspended in 9 parts of trichlorobenzene and 1 part of benzaldehyde and 1—1, 5 parts of phosphorus trichloride or 1 part of phosphorus pentachloride or 1 part of aluminium chloride are added. While well stirring the mass is slowly heated to 130–140° and kept for some hours at this temperature. The reaction product may be isolated as described in the foregoing example. The dyestuff thus obtained is identical with the dyestuff of Example 1.

Example 3

1 part of finely powdered dipyrazolanthrone is heated while stirring to about 120° with 3 parts of benzaldehyde and 1 part of antimony pantachloride. The viscous mass is kept at this temperature for some hours and the product of reaction is isolated as described above. It is identical with the dyestuff described in Example 1.

Example 4

1 part of powdered dipyrazolanthrone is suspended in 10 parts of nitrobenzene and after addition of 1 part of meta- or orthochlorobenzaldehyde and 1 part of phosphorus trichloride the mixture is heated for some hours to 130–140° while stirring. The formed dyestuffs may be isolated as described in Example 1 and may be separated from unchanged dipyrazolanthrone by recrystallizing the raw products from nitrobenzene. Both compounds are yellow dyestuffs.

Example 5

To a mixture of 1 part of powdered dipyrazolanthrone and 10 parts of nitrobenzene 1 part of meta-nitrobenzaldehyde and 1 part of phosphorus trichloride are added and the mass is heated for some hours at 125–130° while stirring. The product of reaction is isolated in the aforesaid manner. It is when dry an olive yellow powder, soluble in sulfuric acid of 66° Bé. with a bluish red color.

When replacing the meta-nitrobenzaldehyde by meta-hydroxybenzaldehyde and working otherwise as described above the reaction product is a dark olive-yellow colored substance. It may be filtered off and washed with hot spirit. It is insoluble in nitrobenzene.

Example 6

1 part of dichlorodipyrazolanthrone (see Example 1 of U. S. Patent No. 1595549) is suspended in 9 parts of nitrobenzene, 1 part of benzaldehyde and 1 part of antimony pentachloride are added and the mixture is heated for some hours to 130–140° while stirring. After cooling down the reddish brown colored solution the product of reaction separates and is isolated by filtration. It may be purified by recrystallization from dichlorobenzene. It dyes cotton brownish yellow shades.

Example 7

2 parts of tetrabromodipyrazolanthrone, obtainable by starting from dipyrazolanthrone according to the process described in U. S. Patent No. 1595549, is suspended in 20 parts of nitrobenzene, 1, 3 parts of benzaldehyde and 1, 3 parts of phosphorus trichloride are added and while stirring the mixture is heated at 100° for some hours. After cooling down the raw product of reaction may be purified by removing adhering nitrobenzene by means of a steam distillation and recrystallizing the residue from nitrobenzene. The dyestuff thus obtained dyes cotton golden orange shades. It dissolves in concentrated sulfuric acid with a reddish orange color.

Example 8

To a suspension of 1 part of dipyrazolanthrone in 10 parts of nitrobenzene while stirring 1 part of paraformaldehyde and 1 part of phosphorus trichloride are added. The mixture is heated for some hours at 100–120° and after cooling down the reaction product is isolated by filtration and freed from exceeding paraformaldehyde and nitrobenzene by washing with hot spirit. The formed dyestuff dyes cotton like dipyrazolanthrone, but the dyeing is more fast to alkali. The dyestuff dissolves in concentrated sulfuric acid with a bluish red color.

When using instead of paraformaldehyde the equivalent amount of paraldehyde and purifying the raw product by recrystallizing it from much nitrobenzene, a dyestuff is obtained, dyeing cotton more brilliant golden orange shades. It dissolves in concentrated sulfuric acid with a bluish red color.

Example 9

To a mixture of 1 part of monoethyldipyrazolanthrone and 10 parts of trichlorobenzene 1 part of paraformaldehyde and 1 part of phosphorus trichloride are added and the mass is heated for some hours at 100–110° while stirring. The dyestuff, isolated as described above, dyes cotton dark golden orange shades. It dissolves in concentrated sulfuric acid with a bluish red color.

I claim:

1. As new compounds vat dyestuffs of the dipyrazol anthrone series containing a benzylidene group being when dry yellow colored mostly crystalline powders, soluble in concentrated sulfuric acid with a bluish red color, dyeing cotton from a bluish to greenish hydrosulfite vat yellow to orange shades, particularly fast to alkali, which compounds are substantially identical with products obtainable by heating at temperatures greater than 100° C. and not above 200° C. a compound of the dipyrazol anthrone series having at least one NH-group with an aromatic aldehyde of the benzene series in the presence of an acid chloride.

2. As a new compound the vat dyestuff of the dipyrazolanthrone series, containing a benzylidene group being when dry a golden yellow powder, crystallizing from organic solvents of a higher boiling point in fine scales, of a golden lustre, soluble in concentrated sulfric acid with a bluish red color, dyeing cotton from a bluish green colored hydrosulfite vat blue shades turning to a pure yellow when exposed to the air, which compound is substantially identical with a product obtainable by heating to about 100–150° dipyrazolanthrone with benzaldehyde in presence of an acid chloride as condensing agent.

In witness whereof I have hereunto signed my name this 23rd day of September 1927.

RUDOLF HEIL.